Figure 1:
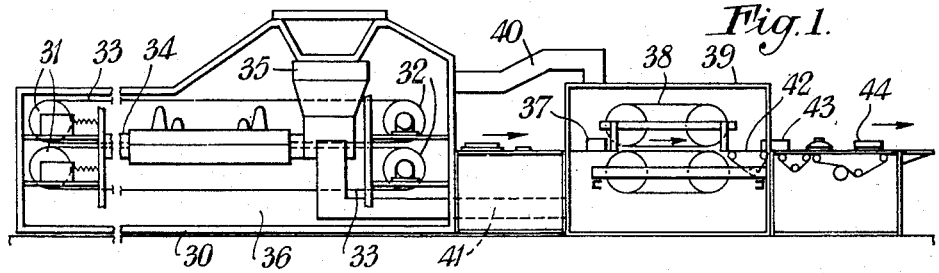

March 1, 1955

J. E. BRANDENBERGER 2,702,971

APPARATUS FOR PRODUCING WRAPPED ARTICLES

Filed Nov. 26, 1952

3 Sheets-Sheet 1

INVENTOR
JACQUES EDWIN BRANDENBERGER
BY
ATTORNEY

March 1, 1955

J. E. BRANDENBERGER 2,702,971

APPARATUS FOR PRODUCING WRAPPED ARTICLES

Filed Nov. 26, 1952

3 Sheets-Sheet 2

INVENTOR

JACQUES EDWIN BRANDENBERGER

BY
ATTORNEY

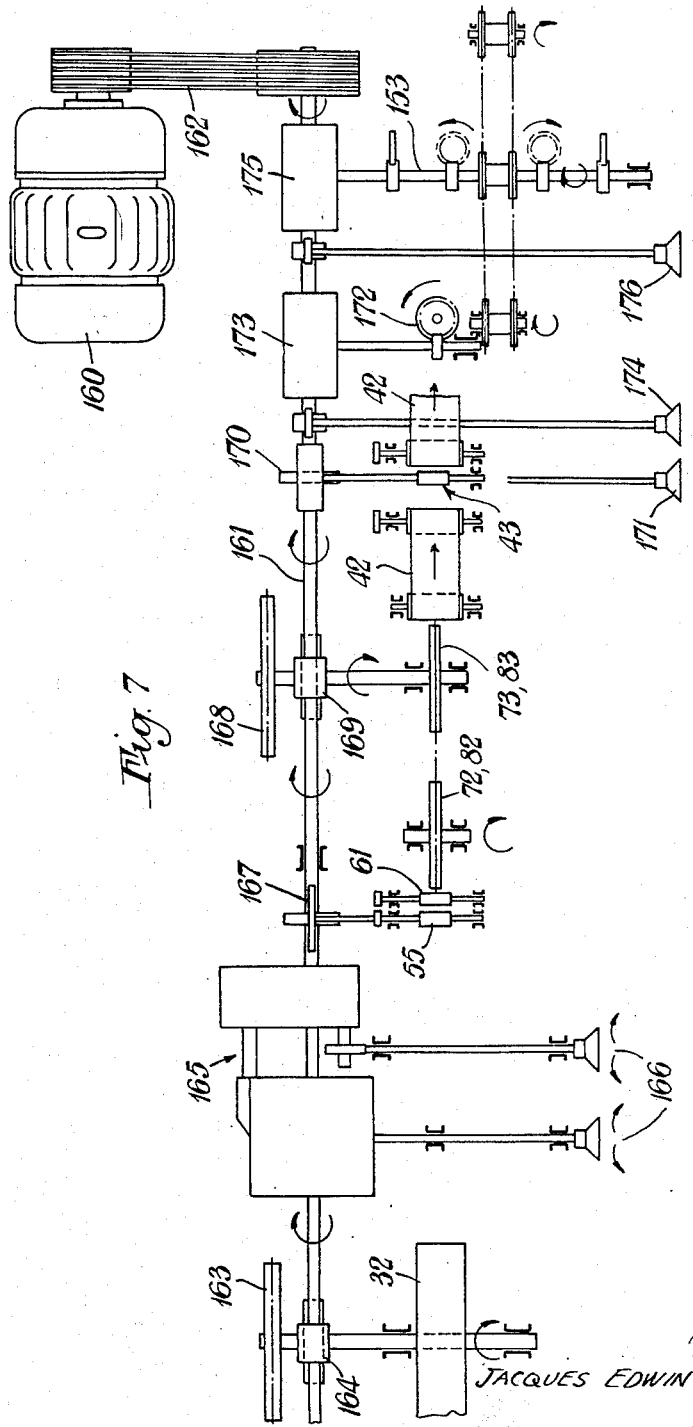

United States Patent Office 2,702,971
Patented Mar. 1, 1955

2,702,971

APPARATUS FOR PRODUCING WRAPPED ARTICLES

Jacques Edwin Brandenberger, Paris, France, assignor to Societe La Cellophane, Basel, Switzerland, a Swiss company Application November 26, 1952, Serial No. 322,771

Claims priority, application Great Britain September 12, 1952

7 Claims. (Cl. 53—55)

In the specification accompanying my Patent No. 2,625,776 there is described a method for the continuous production of wrapped articles, made from pasty or thermoplastic material, more particulary wrapped bars of chocolate and like confectionery, which comprises continuously filling a flexible tube, made from a strip by folding its longitudinal edges round a former, with the material in a plastic state so that the filled tube has a generally flat cross-section, continuously passing the filled tube between smoothing elements which press the flat surfaces of the tube between them to remove surface irregularities and occluded air and to give the flat tube a regular cross-sectional shape, cooling the smoothed tube and cutting the cooled tube into bars. The specification also described an apparatus for producing wrapped bars of chocolate and the like thermoplastic material which comprises means for continuously folding the longitudinal edges of a moving strip around a former to make a flexible tube, means for continuously filling the moving tube with the material in a plastic state so that the filled tube is of a generally flat cross-section, smoothing elements to press continuously on the flat surface of the filled tube whereby surface irregularities and occluded air are removed and the flat tube is given a regular cross-sectional shape, means for cooling the smoothed tube and means for cutting the cooled tube into bars.

According to a particular feature of the said invention the tube filled with material in a plastic condition is delivered to means for pressing the flat surfaces of the tube together to form a closure strip across the tube and there is a tube-cutting means for severing the closure strip to divide the tube into individual bars.

This invention has for its object broadly the provision of an improved construction of smoothing mechanism to that disclosed in the specification of my Patent No. 2,625,776. More specifically, this invention has for its object the provision of a smoothing mechanism which in conjunction with a pressing mechanism ensures that the superposed surfaces of the closure strips are held together against the formation of air pockets between said surfaces.

Figure 2:
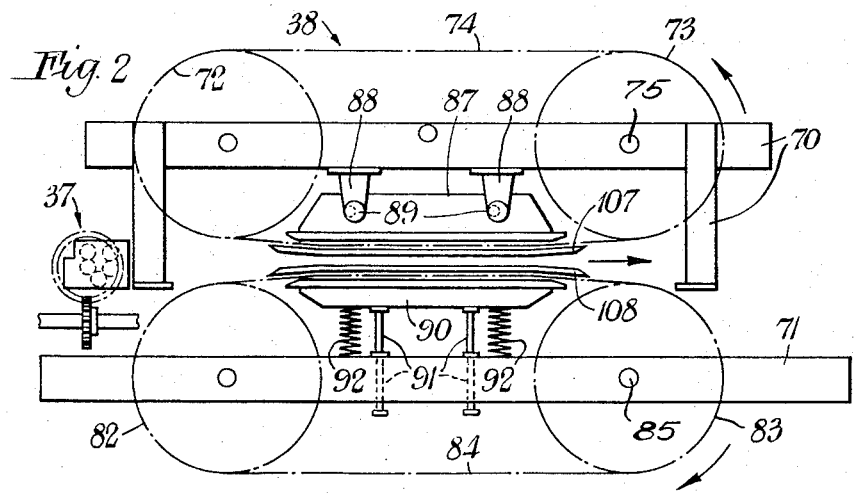
Figure 3:
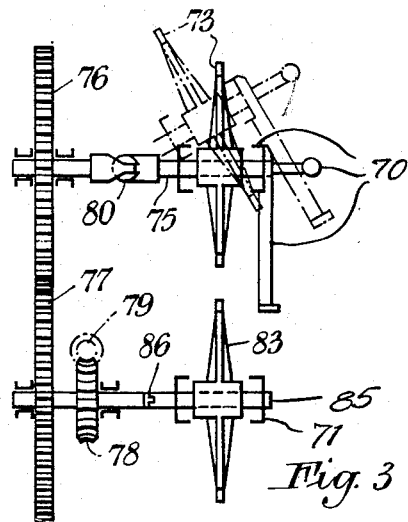
Figure 4:
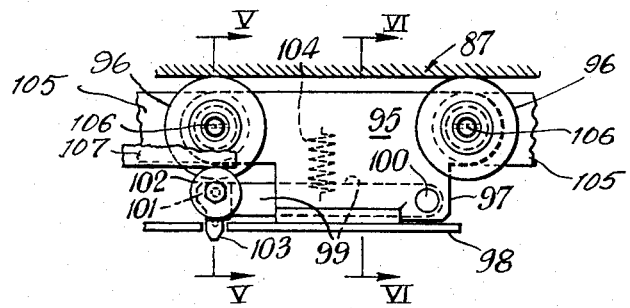
Figure 5:
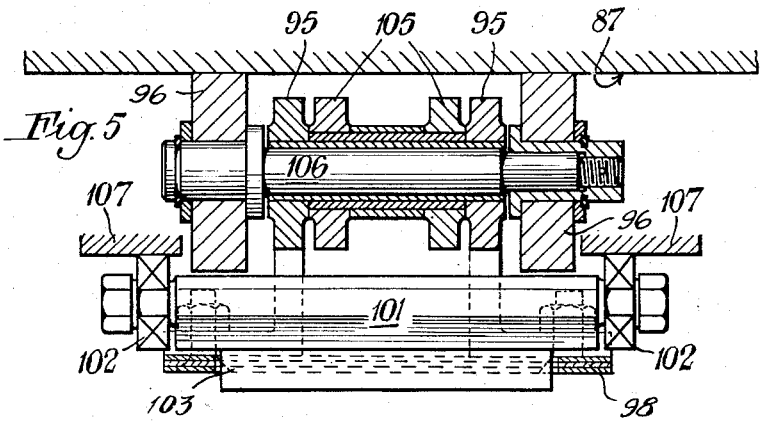
Figure 6:
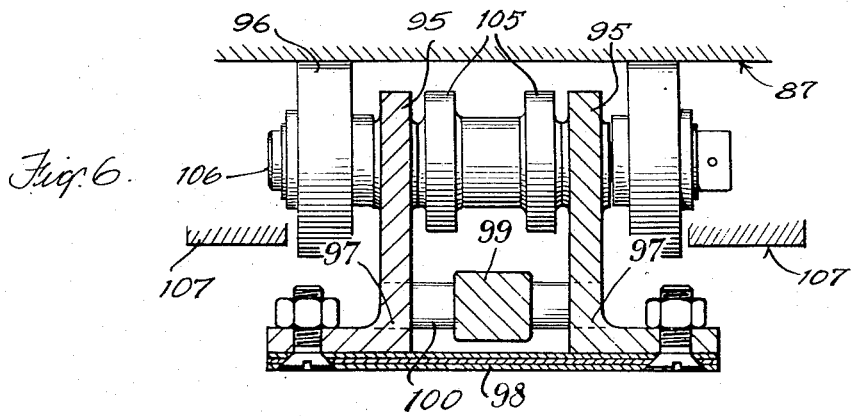

For a fuller understanding of the invention a practical application thereof will now be described, by way of example only, with reference to the accompanying drawings whereof:

Figure 1 is a diagrammatic side view of a complete apparatus for wrapping bars of chocolate in accordance with this invention, Figure 2 is a side view of a smoothing mechanism of the apparatus of Figure 1, Figure 3 is an end view of the apparatus of Figure 2, Figure 4 is a side view of a detail of construction of the smoothing mechanism and to a larger size, Figures 5 and 6 are respectively sections on the lines V—V and VI—VI of Figure 4, and Figure 7 diagrammatically illustrates the drives to the several mechanisms.

A tube is continuously made from a strip and thereafter filled with chocolate in a plastic state as described in my Patent No. 2,625,776 and the filled tube is continuously delivered to the apparatus shown in Figure 1. Referring thereto; the apparatus comprises a frame 30 which supports pairs of drums 31, 32 over which passes endless steel bands 33, the adjacent or inner stretches of which run together lengthwise of the frame and parallel, the filled tube being delivered to the drum 31 to between the inner stretches of the bands to be pressed therebetween. The inner stretches pass through a tunnel 34 through which is circulated cooling air from a fan 35, the air moving in a closed circuit and being returned to the fan through a cooler 36 of any known or convenient construction e. g. of tubular form through which there is circulated a cooling liquid in heat exchange relationship with the air.

The cooled, filled tube is passed to a pressing and indenting mechanism 37 and a smoothing mechanism 38 all housed in an insulated chamber 39 to which is delivered cooling air, from fan 35, by duct 40, the air being returned to the fan 35 by duct 41. The general construction and function of the indenting mechanism 37 is set forth in the specification of my Patent No. 2,625,776. This invention is concerned with the construction of the mechanism 38 and this will next be dealt with more fully. The divided tube is passed on a conveyor band 42 to the cutting and sealing mechanisms 43 and 44 respectively.

The smoothing mechanism comprises an upper and lower frame 70, 71 respectively of which the upper frame carries a pair of sprocket wheels 72, 73 of which sprocket 72 is adjustable lengthwise of the frame to vary the tension of an endless chain 74 passing around the sprocket wheels. The sprocket wheel 73 is mounted on shaft 75 and driven from an electric motor through a gear train comprising gear wheels 76, 77, worm wheel 78 and worm 79 (Figure 3). Shaft 75 is in two parts coupled together by a universal joint 80 so that the upper frame 70 may be swung up (as shown chain dotted in Figure 3) to allow ready access to the mechanism. Of course, sprocket wheel 72 is mounted on a shaft in similar manner to wheel 73 to allow this to be done. The lower frame 71 carries sprocket wheels 82, 83 over which passes a chain 84. Sprocket wheel 83 is carried on shaft 85 which also carries worm wheel 78 so that the chains 74, 84 are driven in synchronism. An Oldham coupling 86 is provided between wheels 83 and 78. Sprocket wheel 82 is adjustable lengthwise of the frame 71 to vary the tension of chain 84.

The upper chain 74 passes under a shoe 87 which is carried by depending brackets 88 mounted on frame 70, the shoe being connected to the brackets by eccentrics 89 so that the shoe is vertically adjustable relatively to the frame.

The lower chain 84 passes over a shoe 90 which is supported from frame 71 by cross bars 91 and is urged vertically upwardly by springs 92, the upward movement being limited by bars 91. In this way the inner (that is, adjacent) stretches of chains 74, 84 are urged together and the distance they are held apart is adjustable.

The chains 74, 84 are of similar construction and will now be described with reference to Figs. 4, 5 and 6. Each chain comprises wide and narrow links of which only the wide links are illustrated. Each wide link comprises a pair of transversely spaced link bars 95 carrying rollers 96 and having depending portions 97 connected together at 98 (Figure 6) by plates which engage the surfaces of the connected separate bars comprising the tube to smooth the surfaces thereof. Pivotally carried by portions 97, at 100, is a bar 99 which lies between, and extends lengthwise of, bars 95 and carries at its free end a cross piece 101. A roller 102 is carried at each end of the cross piece and the latter is provided with a rubber faced strip 103. A spring 104 urges the bar 99 to move the rollers 102 to withdraw strip 103. The wide links described are connected together by narrow links comprising link bars 105 mounted on the spindles 106 of rollers 96 and connecting them together, the link bars 105 carrying bars and rollers equivalent to 99 and 102. It is arranged that a strip 103 occurs at every closure strip of the chocolate-filled tube, tht strips 103 being arranged to co-operate as the chains 74, 84 move round to press the closure strips between them. To effect this pressing operation a guide rail 107, 108 is carried respectively by shoes 87, 90. The arrangement is that as the chains 74, 84 travel round, rollers 96 engage their respective shoes 87, 90 and when the rollers 102 engage the guide rails 107, 108 the latter move the bars 99 against springs 104 to press strips 103 together with the closure strip therebetween. Any chocolate remaining within the area prescribed by the closure strip is thus forced out and the superposed surfaces of the closure strips are held against the formation of air pockets between the surfaces.

The tube comprising a plurality of separate bars connected together by the closure strips is passed to the endless conveyor band 42 (Fig. 1) which takes it to the cutting mechanism 43, which is fully described in my co-pending application Serial No. 322,773, and thence to the sealing mechanism 44, the function and construction of which is fully described in my co-pending application Serial No. 322,772, now Patent No. 2,667,723.

It is an essential requirement that the several mechanisms be driven in synchronism and that means be provided to synchronise the mechanisms. The drive to the mechanisms which enable this to be done is shown diagrammatically in Figure 7.

An electric motor 160 is drivingly coupled to a main shaft 161 by belts 162 and the drives to the several mechanisms are taken off shaft 161. Thus, the drums 32 (Figure 1) are drivingly coupled together through gear wheels 163 (Figure 7) and are driven through helical gearing 164 from shaft 161. The helical gearing 164 is driven from an infinitely variable speed gear box assembly 165 driven by shaft 161. The driving speed of the gear box is adjusted by handwheels 166 so that the mechanism comprising drums 32 may be brought into synchronism with the other mechanisms. The pressing and indenting mechanism 37 is driven from shaft 161 through helical gearing 167. The sprocket wheels 73, 83 of the smoothing mechanism (Figs. 2 and 3) are coupled together through gear wheels 168 and driven from shaft 161 through helical gearing 169. The cutter mechanism 43 is also driven from shaft 161 through helical gearing 170 and a variable speed gear adjustable by handwheel 171. The sealing mechanism 44 is driven through helical gears 172 from an infinitely variable speed gear box 173 which is driven from shaft 161 and the output speed of which is varied by handwheel 174. Similarly a conveyor 127 for carrying the finished, individual bars of wrapped chocolate away from the machine is driven from shaft 161 through infinitely variable speed gear box 175 adjustable by handwheels 176, the cross shaft 153 being driven by said gear box.

The provision of helical gears ensures that back-lash is reduced to a minimum so that the drive to the several mechanisms ensures synchronism.

I claim:

1. Apparatus for producing wrapped bars of thermoplastic material from a flexible tube of generally flat cross-section filled with the material in a plastic state and divided into individual connected bars by transverse closure strips, which comprises a smoothing mechanism for removing surface irregularities and occluded air and for imparting a regular cross-sectional shape to the tube, said mechanism comprising upper and lower, superposed, endless chains having smoothing plates to engage the surfaces of the bars together to form the tube the smoothing plates being carried by certain links of the chains and each of said links pivotally carrying a cross strip, each chain passing across a pair of guide rails, one to displace the smoothing plates to engage the bars and the other independently to displace the cross strips to engage the closure strips.

2. Apparatus as claimed in claim 1 wherein each cross strip is spring urged away from the closure strip and carries a roller to engage its associated guide rail for movement to engage the closure strips.

3. Apparatus as claimed in claim 2, wherein each of said links carries rollers to run along the associated guide rail.

4. Apparatus as claimed in claim 3 wherein the guide rails associated with one of the chains is adjustable towards and away from the other guide rail to vary the distance between superposed smoothing plates.

5. Apparatus as claimed in claim 4 in which said adjustable guide rails are carried by a shoe which is supported from a frame of the apparatus by eccentrics which effect said adjustment.

6. Apparatus according to claim 5 in which the guide rails associated with said other chain is spring urged towards the adjustable guide rails.

7. Apparatus as claimed in claim 1 wherein one of said chain assemblies is mounted for tilting movement relatively to the other chain assembly whereby ready access may be had to the assemblies.

References Cited in the file of this patent

UNITED STATES PATENTS 2,625,776    Brandenberger    Jan. 20, 1953